UNITED STATES PATENT OFFICE.

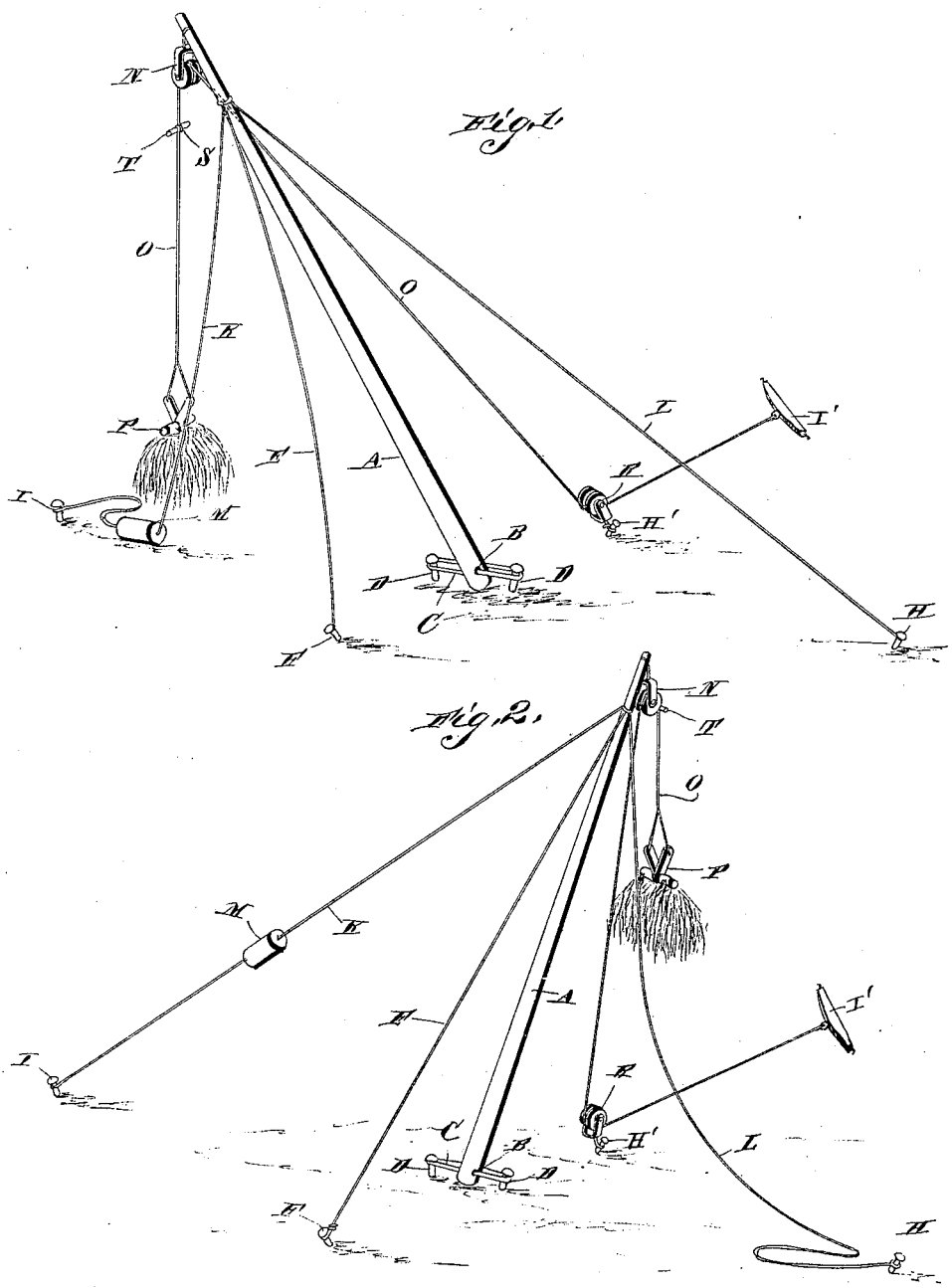

HENRY AUGUSTUS BARKELEW, OF WILLIAMSTOWN, MISSOURI.

HAY-STACKER.

SPECIFICATION forming part of Letters Patent No. 398,114, dated February 19, 1889.

Application filed October 31, 1888. Serial No. 289,592. (No model.)

*To all whom it may concern:*

Be it known that I, HENRY AUGUSTUS BARKELEW, a citizen of the United States, residing at Williamstown, in the county of Lewis and State of Missouri, have invented a new and useful Improvement in Hay-Stackers, of which the following is a specification.

My invention relates to an improvement in hay-stackers; and it consists in the peculiar construction and combination of devices that will be more fully set forth hereinafter, and particularly pointed out in the claims.

In the accompanying drawings, Figure 1 is a perspective view of a hay-stacker embodying my improvement, showing the position of the same when the hay-fork is being loaded. Fig. 2 is a similar view showing the position of the stacker when the hay-fork is being discharged.

A represents a pole of suitable length, provided with a transverse opening, B, in its lower end, through which extends a loop, C, of rope or chain.

D represents a pair of stake-pins, which are driven into the ground at a suitable distance apart and over which the loop C is passed, the lower end of the pole being thereby caused to bear on the ground between the stake-pins, and the pole being adapted to be swung to any desired inclination.

E represents a guy-rope, which is attached near the upper end of the pole and has its lower end secured to a stake-pin, F, which is driven into the ground at a suitable distance in rear of the pole. On opposite sides of the base of the pole, and at suitable distances therefrom, are stake-pins H I, which are driven into the ground. The stake-pin I is connected to the pole at a suitable distance from the upper end of the latter by a rope, K, and the stake-pin H is connected to the pole by means of a rope, L. The said ropes L K are of such a length that when the pole is inclined in either direction one of said ropes will be taut and the other one slack. Secured to the rope K is a weight, M, the function of which is normally to incline the pole A toward the stake-pin I, as illustrated in Fig. 1.

N represents a block, which is suspended from the upper end of the pole.

O represents an elevating-rope, which passes over the pulley in the said block, has a suitable hay-fork, P, secured to one end, and has its opposite end passed through a block, R, which is arranged adjacent to the stake-pin H and is secured to a similar stake-pin, H', the said end of the elevating-rope being secured to a whiffletree, I', to which a horse is harnessed. A loop, S, is made in the rope O at a suitable distance from the fork, according to the height of the pole and the desired height of the stack, and in the said loop is secured a transverse pin, T, which forms a gage and is adapted to strike against the block N when the hay-fork is elevated.

The operation of my invention will be very readily understood. When the pole is in the position shown in Fig. 1, with the rope L taut and the rope K slack, the block N is over the point where the fork is loaded. The elevating-rope is then drawn outward from the block R until the gage T strikes the block N and the loaded fork has been elevated a sufficient distance to clear the top of the stack, and as the elevating-rope continues to be drawn outward it swings the upper end of the pole toward the stake-pin H, and thereby carries the loaded fork over the stack. By stopping the horse the fork may be poised at any desired point above the stack. As the pole moves in this direction, the rope L slackens and the rope K becomes taut and raises the weight M. The hay is discharged from the fork at any point desired on the top of the stack, and the horse is then backed, when the weight M swings the pole backward to its initial position and clears the fork from the stack, and as the horse continues to back the fork is lowered and loaded with hay, as before.

From the foregoing description it will be understood that a hay-stacker thus constructed is extremely cheap and simple, may be very readily operated, and is capable of causing the hay to be discharged at any desired point on the stack, thus enabling the stack to be very compactly and symmetrically formed.

Having thus described my invention, I claim—

1. In a hay-stacker, the pole A, having the transverse opening in its lower end, the rope loop C in the said opening, and the stake-pins D, driven into the ground on opposite sides of the lower end of the pole and engaging the said loop, substantially as described.

2. The combination, in a hay-stacker, of the leaning pole A, having the transverse opening in its lower end, the loop C in said opening, and the stake-pins D, driven in the ground on opposite sides of the lower end of the pole and engaging the loop, the guy-ropes connected to the pole, whereby it is adapted to be swung in either direction, one of said guy-ropes having the weight M, the block suspended from the upper end of the pole, and the elevating-rope engaging the block, said rope having the gage T secured thereto at a suitable point and adapted to come in contact with the block, for the purpose set forth, substantially as described.

In testimony that I claim the foregoing as my own I have hereto affixed my signature in presence of two witnesses.

HENRY AUGUSTUS BARKELEW.

Witnesses:
   J. T. GLAVES,
   J. W. RAMSEY.